(No Model.)

P. ANDERSEN.
WAGON REACH.

No. 414,178. Patented Nov. 5, 1889.

Attest
Alfred M. Allen
George Friedman

Inventor
Peter Andersen
by Arthur Stine Atty.

UNITED STATES PATENT OFFICE.

PETER ANDERSEN, OF FORT WAYNE, INDIANA, ASSIGNOR TO HENRY G. OLDS, OF SAME PLACE.

WAGON-REACH.

SPECIFICATION forming part of Letters Patent No. 414,178, dated November 5, 1889.

Application filed July 3, 1889. Serial No. 316,409. (No model.)

*To all whom it may concern:*

Be it known that I, PETER ANDERSEN, a citizen of the United States, residing at Fort Wayne, in the county of Allen and State of Indiana, have invented a certain new and useful Improvement in Wagon-Reaches, of which the following is a full, clear, and exact description, reference being had to the accompanying drawings, forming part of this specification.

My invention relates to an improvement in wagon-reaches, and has for its object the construction of a double reach connecting the front and rear axles and rigidly attached to the front head-block, which shall combine lightness with great strength and rigidity.

The details of my invention will be more fully hereinafter set forth in the specification and drawings.

Figure 1:
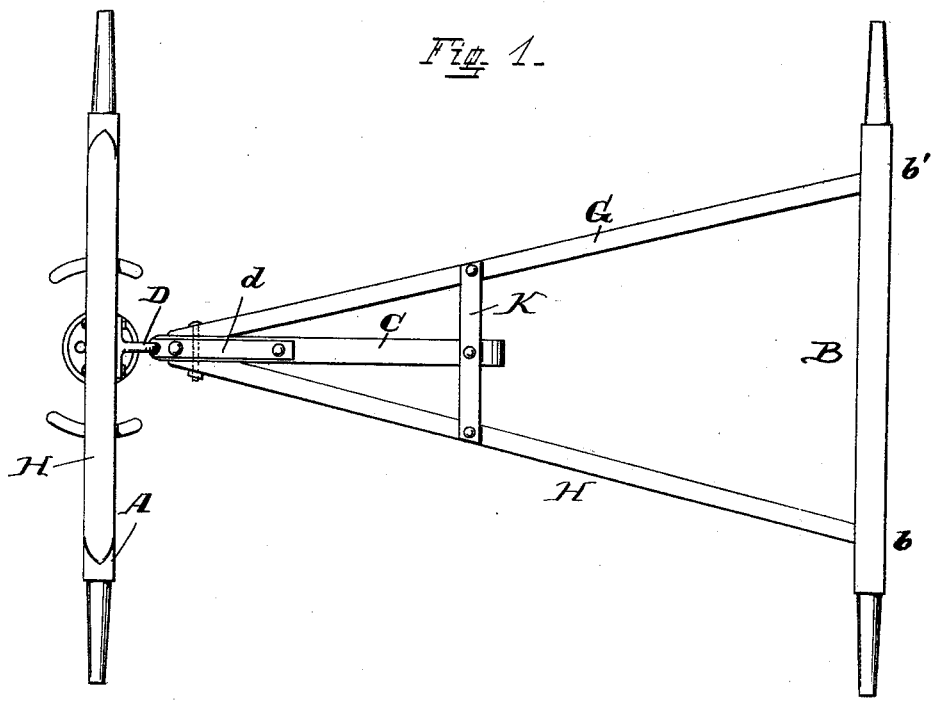
Figure 2:
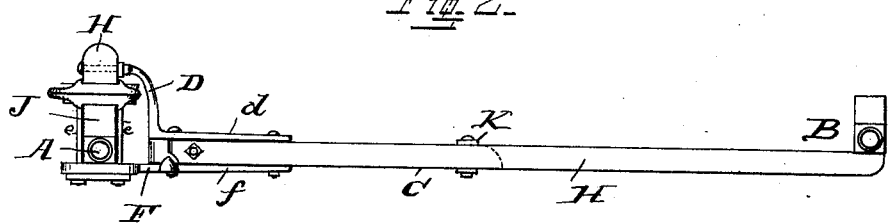
Figure 3:
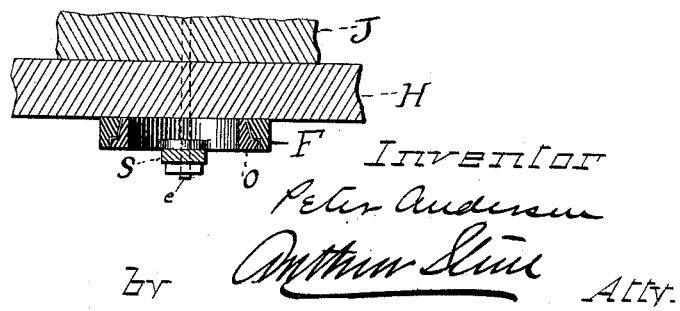

Figure 1 is a top plan view of my improved reach. Fig. 2 is a vertical cross-section. Fig. 3 is a section of the ring and circular plate.

My improved reach is adapted to be used on almost any style of light vehicle, but is illustrated as applied in connection with my improved fifth-wheel construction, as set forth in my application for Letters Patent filed at the same time with this application.

H is the head-block, to which are attached the springs carrying the body of the vehicle.

J is the bolster on top of the axle, to which the lower bearing-plate of the fifth-wheel is attached, the bolster being firmly bolted or clamped to the axle and virtually forming part of it.

To the head-block is rigidly bolted an iron bracket D, which extends back and along the top of the short bar C, forming part of the reach. This bar extends back toward the rear axle a short distance. To the front end of the bar C, on either side of it, are firmly and rigidly attached, usually by bolts, the two bars G H, which extend back to the rear axle B, to which they are securely fastened, as seen at *b b'*. At or near the rear end of the bar C is a cross-brace K, preferably consisting of two metal plates, one on top and one beneath the bars C, G, and H, securely bolted to said bars, thus forming a triangular frame or truss which is very rigid and strong, at the same time very light.

I not only secure the double attachment to the rear axle, but by the center bar C and cross-brace K produce a frame-work or truss-gearing connecting the front and rear axles in a very strong and secure manner. On the lower side of the reach or the bar C is a bracket F *f*, the rear end of which is firmly bolted to the bar C and also to the upper bracket D *d*. The forward end of this bracket F is attached to the axle by a swivel-joint. Its front end is made in the form of a ring, with an internal shoulder or flange against this shoulder. Bearing upwardly is a circular plate or disk O, which is bolted up against the axle by bolts *e e*, thus permitting it to rotate freely in the ring on the bracket F. By this means I have the reach rigidly attached to the head-block and pivotally attached to the axle or bolster.

Having thus fully described my invention, what I claim, and desire to secure by Letters Patent, is—

1. A wagon-reach consisting of two bars, their front ends connected rigidly to a short bar C, and the three bars firmly bolted to the cross-brace K, forming a truss, in combination with the bracket F, having at its front end a ring integral therewith, and a circular plate rigidly attached to the bolster and arranged to rotate freely in said ring, substantially as and for the purpose described.

2. A wagon-reach consisting of two bars, their rear ends attached to the rear axle and their front ends bolted together and to a short bar C, forming a frame or truss, in combination with the bracket D, rigidly attached to the head-block, the bracket F, having its front end in the form of a ring, and a circular plate rigidly attached to the bolster, so that the reach may be rigidly attached to the head-block and pivotally attached to the bolster, in the manner and for the purpose described.

PETER ANDERSEN.

Witnesses:
WM. JOHNSTON, Jr.,
J. H. WILDER.